United States Patent [19]
Lin

[11] Patent Number: 5,761,815
[45] Date of Patent: Jun. 9, 1998

[54] GARDENING SHEARS

[76] Inventor: Yu-Tang Lin, No. 21, Wan Feng Lane, Wan Feng Village, Fu Hsing Hsian, Chang Hua Hsien, Taiwan

[21] Appl. No.: 804,481

[22] Filed: Feb. 21, 1997

[51] Int. Cl.⁶ .................................................. B26B 13/00
[52] U.S. Cl. ........................................ 30/251; 30/190
[58] Field of Search ........................ 30/251, 190, 254, 30/244, 238, 261–262, 249, 230, 92; 81/314

[56] References Cited

U.S. PATENT DOCUMENTS 4,094,064  6/1978  Nishikawa et al. .................... 30/251 X
4,674,184  6/1987  Anderson ............................. 30/251 X

*Primary Examiner*—Douglas Watts
*Attorney, Agent, or Firm*—Browdy and Neimark

[57] ABSTRACT

A gardening shears is composed of a fixed jaw, a movable jaw fastened pivotally with the fixed jaw, a rocking arm fastened with the fixed jaw and provided with a locating slot, an actuating device linking the movable jaw with the rocking arm, and two handles fastened respectively with the movable jaw and the rocking arm.

3 Claims, 3 Drawing Sheets

GARDENING SHEARS

FIELD OF THE INVENTION

The present invention relates generally to a gardening implement, and more particularly to a gardening shears.

BACKGROUND OF THE INVENTION

The conventional gardening shears is a handy tool for trimming a tree or shrub; nevertheless it is limited in design in that it does not work well in trimming a coarse branch off a tree or shrub. At the outset of trimming a coarse branch, the user of the conventional gardening shears must make an incision in the branch with the blades of the gardening shears so as to locate the blades. However, as the cutting action is executed, the blades of the gardening shears are often caused to slip out of the incision. As a result, the trimming must be started all over again. It is therefore readily apparent that several trimming attempts are often called for, and that the conventional gardening shears is inefficient at best.

SUMMARY OF THE INVENTION

The primary objective of the present invention is therefore to provide a gardening shears free from the shortcomings of the prior art gardening shears described above.

In keeping with the principle of the present invention, the foregoing objective of the present invention is accomplished by a gardening shears, which is composed of a fixed jaw, a movable jaw having a blade opposite in location to the fixed jaw, a rocking arm fastened pivotally with the fixed jaw, an actuating device fastened pivotally with the movable jaw such that the movable jaw is actuated to turn by the actuating device when the rocking arm is in motion, and two handles fastened respectively with the movable jaw and the rocking arm.

The foregoing objective, features, functions, and advantages of the present invention will be more readily understood upon a thoughtful deliberation of the following detailed description of the present invention in conjunction with the accompanying drawings.

DETAILED DESCRIPTION OF THE INVENTION

Figure 1:
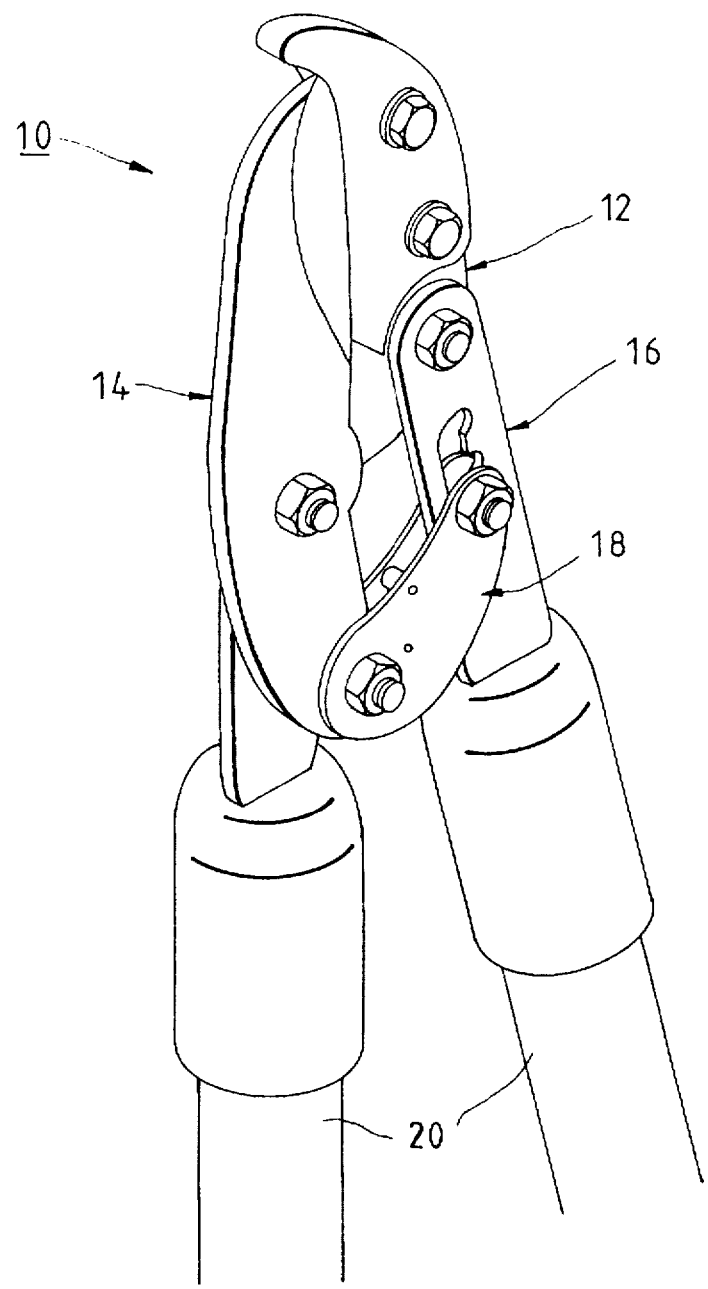
FIG. 1 shows a perspective view of a gardening shears of the present invention.
Figure 2:
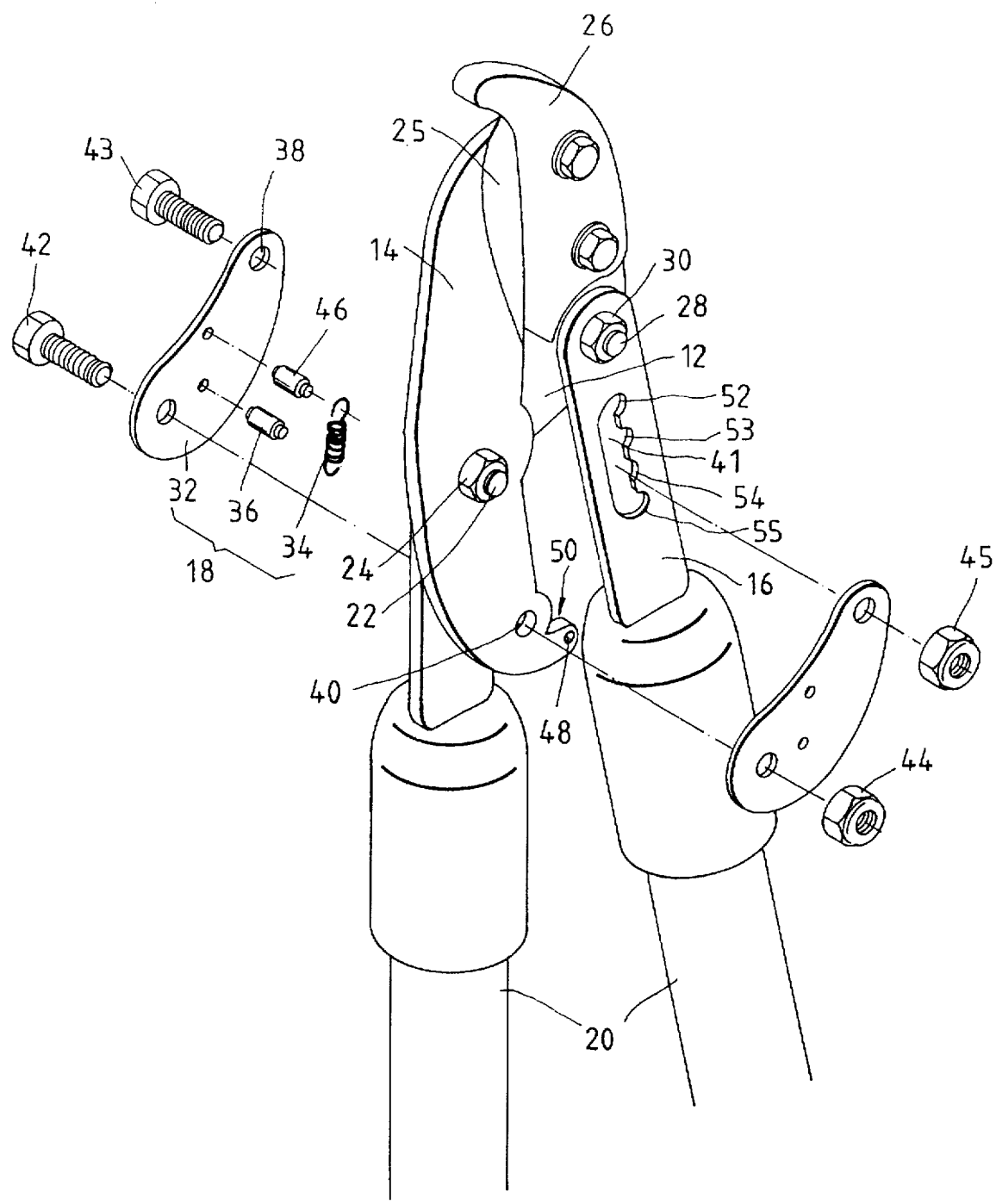
FIG. 2 shows an exploded view of the gardening shears of the present invention.

As shown in FIGS. 1 and 2, a gardening shears 10 of the present invention is composed of a fixed jaw 12, a movable jaw 14, a rocking arm 16, an actuating device 18, and two handles 20.

The movable jaw 14 is fastened pivotally with the mid-segment of the fixed jaw 12 by a bolt 22 in conjunction with a nut 24. The movable jaw 14 has a blade 25 opposite in location to anvil block 26 of the fixed jaw 12. The rocking arm 16 is fastened pivotally at one end thereof with the fixed jaw 12 by means of a bolt 28 and a nut 30. The movable jaw 14 and the rocking arm 16 are linked by the actuating device 18 such that the movable jaw 14 is actuated to turn when the rocking arm 16 is in motion. The two handles 20 are fastened respectively with the movable jaw 14 and the rocking arm 16.

The actuating device 18 comprises two pulling pieces 32, a resilient member 34, and a position restricting member 36. The pulling pieces 32 are provided respectively with two pivoting holes 38 opposite in location to each other for fastening the pulling pieces 32 with the movable jaw 14 and the rocking arm 16 by means of two bolts 42 and 43, which are put through the pivoting holes 38 of the pulling pieces 32 and a through hole 40 of the movable jaw 14. The bolts 42 and 43 are provided respectively with nuts 44 and 45 fastened therewith. The resilient member 34 is an expansion spring and is located between the two pulling pieces 32 such that one end is engaged with a short rod 46, and that another end is engaged with a retaining hole 48 of the movable jaw 14. The resilient member 34 is intended to enable the two pulling pieces 32 to deflect clockwise. The position restricting member 36 is a short bar and is located between the two pulling pieces 32 such that the position restricting member 36 is corresponding in location to a cut 50 of the movable jaw 14, and that the position restricting member 36 is capable of confining the deflection of the pulling pieces 32 in conjunction with the cut 50 of the movable jaw 14.

The rocking arm 16 has a locating slot 41, which is provided in the inner wall thereof with four arcuate recesses 52, 53, 54 and 55. The two pulling pieces 32 are capable of shifting from one position to another, thanks to the bolt 43 which is capable of moving from one of the arcuate recesses 52, 53, 54 and 55 to another.

Figure 3:
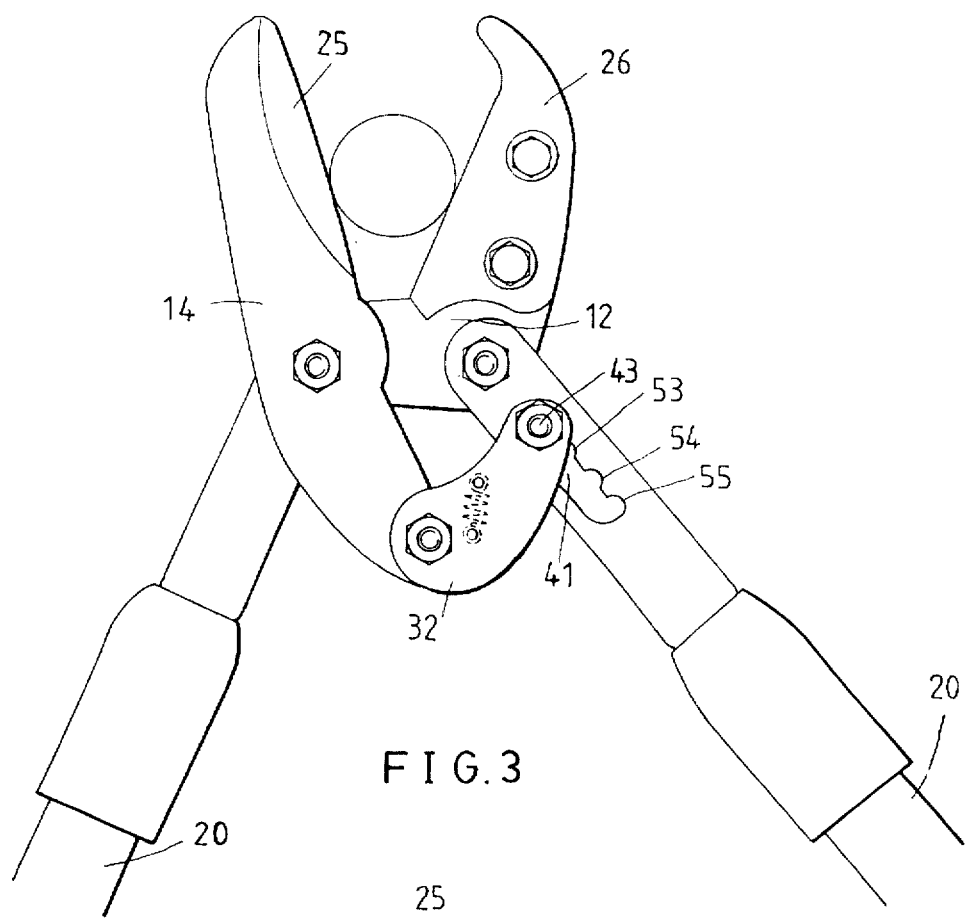
FIG. 3 shows a schematic view of the present invention in action.
Figure 4:
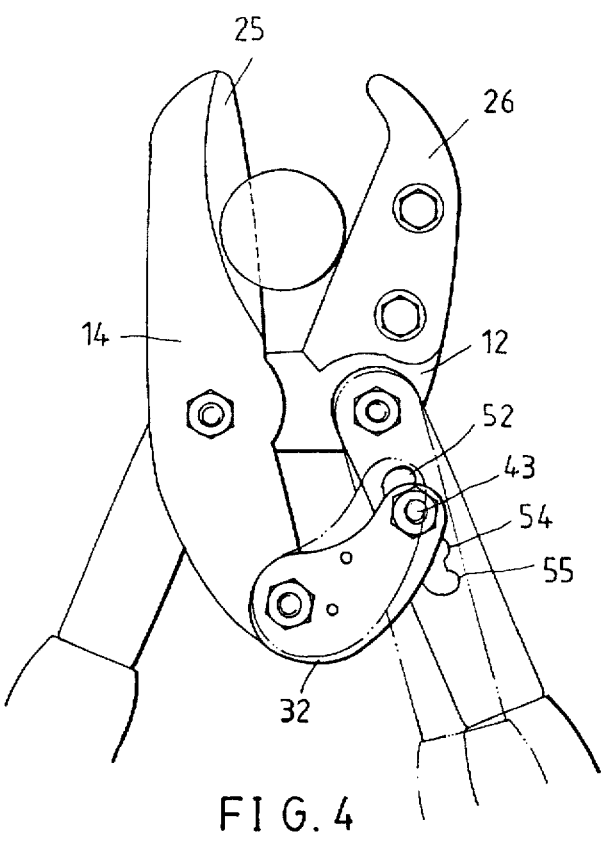
FIG. 4 shows another schematic view of the present invention at work.

In operation, the two handles 20 are moved in the opposite directions such that the bolt 43 is located in the arcuate recess 52, and that the fixed jaw 12 and the movable jaw 14 form an angle. The twig or branch intended to be trimmed is then located between the blade 25 and the anvil block 26 before the handles 20 are forced towards each other to enable the blade 25 to sever the twig or branch of a tree or shrub, as illustrated in FIG. 3. In the event that the severing of the twig or branch can not be executed with ease, the handle 20 which is fastened with the rocking arm 16 is moved in a direction away from another handle 20 which is fastened with the movable jaw 14, so as to cause the two pulling pieces 32 to be pulled by the resilient member 34 to deflect clockwise. As a result, the bolt 43 is caused to slide into the arcuate recess 53 from the arcuate recess 52, as illustrated in FIG. 4. As this adjustment described above is under way, the blade 25 remains in contact with the twig or branch. If the user of the gardening shears 10 of the present invention continues encountering with difficulty in severing the twig or branch, he or she may follow the instructions described in the above text in conjunction with FIG. 4 to enable the bolt 43 to slide into the arcuate recess 54 or 55 so as to expand the angle formed between the two handles 20.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A gardening shears comprising:

a fixed jaw;

a movable jaw fastened pivotally with said fixed jaw and provided with a cutting blade fastened therewith such that said cutting blade is opposite in location to said fixed jaw;

a rocking arm fastened pivotally at a first end thereof with said fixed jaw and provided with a locating slot;

an actuating device fastened pivotally at a first end thereof with said movable jaw such that a second end of said actuating device is capable of being located in said locating slot of said rocking arm for linking said rocking arm with said movable jaw; and two handles fastened respectively with said movable jaw and a free end of said rocking arm;

wherein said locating slot of said rocking arm is provided in one side of an inner wall thereof with a plurality of arcuate recesses for locating said second end of said actuating device;

wherein said fixed jaw is provided with an anvil block fastened therewith such that said anvil block is opposite in location to and capable of cooperating with said cutting blade of said movable jaw;

wherein said actuating device comprises two pulling pieces fastened pivotally and respectively at a first end thereof with said movable jaw such that a second end of each of said two pulling pieces is located in said locating slot of said rocking arm, said actuating device further comprising a resilient element located between said two pulling pieces such that a first end of said resilient element is fastened with said movable jaw, and that a second end of said resilient element is fastened with a short rod fastened between said two pulling pieces, and further that said resilient element enables said two pulling pieces to deflect.

2. The gardening shears as defined in claim 1, wherein said actuating device further comprises a position restricting member located between said two pulling pieces such that said position restricting member is engageable with a retaining cut of said movable jaw for confining a deflection angle of said two pulling pieces.

3. The gardening shears as defined in claim 1, wherein said two pulling pieces are provided respectively at a first end thereof with a pivoting hole for linking said movable jaw and said rocking arm by a bolt engaging said pivoting hole and a through hole of said movable jaw, said two pulling pieces further provided respectively at a second end thereof with a pivoting hole for linking said movable jaw and said rocking arm by a bolt engaging said pivoting hole of said a second end of said pulling pieces and said locating slot of said rocking arm.

* * * * *